United States Patent Office 2,834,775
Patented May 13, 1958

2,834,775

CARBAMATE COMPOUNDS

Fred E. Boettner, Philadelphia, Pa., assignor to Rohm & Haas Company, Philadelphia, Pa., a corporation of Delaware No Drawing. Application August 19, 1954
Serial No. 451,045

10 Claims. (Cl. 260—211)

This invention relates to a method for the preparation of carbamate compounds and more particularly to N-alkyl-N-sorbitylureas and the cyclic urethanes of N-alkyl-N-sorbitylcarbamic acid. This invention further relates to the cyclic urethanes of N-alkyl-N-sorbitylcarbamic acid as new compositions of matter.

The present invention concerns the reaction between urea and an N-alkyl-glucamine, in which the alkyl group contains one to eighteen carbon atoms. Typical of the alkyl groups that may be employed are methyl, ethyl, propyl, isopropyl, butyl, isobutyl, tert-butyl, sec-butyl, pentyl, hexyl, octyl, isoöctyl, tert-octyl, decyl, isodecyl, tert-decyl, dodecyl, tridecyl, tetradecyl, hexadecyl, octadecyl, tert-octadecyl, and the like. While urea itself is the preferred reactant in the instant invention, it is possible to make N-alkyl-N-sorbitylsubstituted ureas from simply substituted ureas such as methylurea, ethylurea, uns-dimethylurea, uns-diethylurea, propylurea, butylurea, and the like.

The type of product formed from the present reaction is determined by the reaction conditions. The milder reaction conditions favor the formation of the N-alkyl-N-sorbitylureas while the more severe reaction conditions favor the formation of the cyclic urethanes of the N-alkyl-N-sorbitylcarbamic acid. When the reaction conditions are somewhere in between the mild and the severe a mixture of products is obtained. The classification of the reaction conditions is based on a combination of temperature, time, and the individual characteristics of the particular reactant employed. As a general rule the lower molecular weight reactants are more readily activated and conversely with the higher molecular weight reactants.

The temperature range in which the present reaction is conducted is preferably 110 to 175° C. At temperatures appreciably lower than 110° C. the reaction is quite sluggish and at temperatures appreciably greater than 175° C. most of the reactants and products tend to decompose. Temperatures in the range of 110 to 140° C. strongly favor the formation of the N-alkyl-N-sorbitylureas and in such a range the products are predominantly the N-alkyl-N-sorbitylureas. In the temperature range of 150 to 175° C. the products formed are predominantly the cyclic urethanes of N-alkyl-N-sorbitylcarbamic acid. In between the two temperature ranges just set forth there is usually obtained a mixture of products whose exact composition is strongly influenced by the individual reactants concerned. Actually, it is possible to obtain considerable yields of the N-alkyl-N-sorbitylureas in the range of 110 to 160° C. and, likewise, appreciable yields of the cyclic urethanes are achieved in the range of 140 to 175° C. While it is apparent that at some temperatures either of the two types of products may be formed it has been observed that usually it takes an appreciable increase in temperature, such as 10° C. or more, to form a cyclic urethane of N-alkyl-N-sorbitylcarbamic acid in predominant amounts rather than an N-alkyl-N-sorbitylurea from the same reactants within the same reaction period. It is frequently possible to obtain the cyclic urethanes in the temperature range that favors the formation of the ureas by maintaining an excessively prolonged reaction period.

Time is a somewhat critical factor in the present invention. Generally about two to four hours of reaction time are preferred for the formation of the N-alkyl-N-sorbitylureas, whereas about three and a half to six hours are preferred for the formation of the cyclic urethanes of N-alkyl-N-sorbitylcarbamic acid. It is possible, particularly where the ranges of temperatures for the formation of the N-alkyl-N-sorbitylureas and cyclic urethanes of N-alkyl-N-sorbitylcarbamic acid overlap to favor one type of product over the other by varying the time of reaction. Generally, the shorter periods of time favor the formation of the N-alkyl-N-sorbitylureas, whereas the longer periods of time favor the formation of the cyclic urethanes of N-alkyl-N-sorbitylcarbamic acid. It is frequently difficult to foretell accurately the composition of the product from considerations of absolute time alone since results may vary appreciably with the individual N-alkyl-glucamine reactants and the particular temperatures. However, it is possible to accurately determine the desired duration of the reaction by measuring the amount of ammonia liberated during the reaction. In order to form the N-alkyl-N-sorbitylureas one equivalent of ammonia has to be liberated from the reaction mixture, whereas there need be two equivalents of ammonia liberated in order to form the cyclic urethanes of N-alkyl-N-sorbitylcarbamic acid. Therefore, it is possible to measure the amount of ammonia evolved and thereby determine the progress of the reaction. If it is desired to form an N-alkyl-N-sorbitylurea the reaction is halted after one equivalent of ammonia has been liberated. If, on the other hand, the cyclic urethane of an N-alkyl-N-sorbitylcabaramic acid is desired the reaction is continued until two equivalents of ammonia are evolved. Therefore it is easier and more reliable to determine the duration of the reaction by the amount of ammonia evolved rather than by using absolute units of time and, therefore, ammonia evolution is the usual and preferred standard of determining the reaction time.

Two types of compounds may be formed according to the present invention as has been previously discussed. When one equivalent of ammonia is evolved during the reaction the principal product is the N-alkyl-N-sorbitylurea. If, on the other hand, two equivalents of ammonia are liberated cyclization occurs between the carbonyl carbon and a sorbityl carbon through an oxygen atom and a cyclic urethane of N-alkyl-N-sorbitylcarbamic acid is the main product.

The reactants of the present invention combine in equimolecular proportions to form N-alkyl-N-sorbitylureas and cyclic urethanes of N-alkyl-N-sorbitylcarbamic acids as described previously. The products are obtained without any additional steps of separation, except that if a mixture of the products has been formed it is usually desirable to separate the individual product preferably by selective recrystallization from a suitable solvent such as 2B benzene denatured alcohol. The products are usually clear, white, or light tan solids and semi-solids. Some of these products resemble glass in appearance. The N-alkyl-N-sorbitylureas have many applications in the paper industry, being particularly suitable as rewetting agents on wet-strength paper. The cyclic urethanes are surface active compounds that are useful as depressants of the surface tension of water, foam stabilizers, and detergents. They also show appreciable anti-bacterial systemic activity and fungicidal activity, while being generally non-phytotoxic.

The compounds of the present invention are prepared in a manner shown in the following illustrative examples in which parts by weight are used throughout.

*Example 1*

Into a half-liter three neck flask equipped with a stirrer, a thermometer and a reflux condenser having an ammonia absorption tower in which the ammonia liberated from the reaction can be absorbed in water there were added 39 parts of N-methylglucamine and 12 parts of urea. The dry reactants were thoroughly mixed and then heated slowly to 120 to 130° C. over a period of two hours. The mixture was then held at 120 to 127° C. while the liberated ammonia was absorbed in the absorption tower. The reaction mixture was cooled after one equivalent of ammonia had been liberated. There formed on standing a glass-like semi-solid which gave an analysis of 11.5% nitrogen (11.7% theoretical). The product was recrystallized from 2B benzene denatured alcohol, filtered, and dried, and then gave a melting range of 136 to 140° C. The product was identified as N-methyl-N-sorbitylurea.

*Example 2*

There were mixed together in a reaction vessel 90 parts of N-methylglucamine and 30 parts of urea. The mixture was heated to 130 to 150° C. for in excess of four and a half hours. During this time the ammonia liberated was absorbed in an ammonia absorption tower. The reaction mixture was cooled after two equivalents of ammonia had been evolved. A clear solid crystallized on standing. This solid product was recrystallized from 2B benzene denatured alcohol, filtered, and dried. The product gave a melting range of 145 to 148° C. and an analysis of 43.3% carbon (43.4% theoretical), 7.0% hydrogen (6.78% theoretical), and 6.7% nitrogen (6.33% theoretical). The product was identified as the cyclic urethane of N-methyl-N-sorbitylcarbamic acid.

*Example 3*

There were mixed together in a reaction vessel 147 parts of N-octylglucamine and 30 parts of urea. The mixture was slowly heated to 110 to 125° C. for about three and a half hours during which time there was liberated and absorbed in an ammonia absorption tower one equivalent of ammonia. The reaction mixture was allowed to cool and a crystalline solid formed. The solid product was recrystallized from 2B benzene denatured alcohol, filtered, and dried. The product was identified as N-octyl-N-sorbitylurea.

*Example 4*

There were introduced into a reaction vessel 118 parts of N-butylglucamine and 30 parts of urea. The temperature of the system was raised to and maintained at 140 to 155° C. for a period of about four hours, during which time two equivalents of ammonia were liberated and absorbed in an ammonia absorbing tower. The temperature of the system was allowed to return to room temperature. A crystalline solid formed and it was recrystallized from 2B benzene denatured alcohol, filtered, and dried. The product was identified as the cyclic urethane of N-butyl-N-sorbitylcarbamic acid.

*Example 5*

A mixture of 70 parts of N-dodecylglucamine and 13 parts of urea was added to a reaction vessel and heated to a range of 110 to 125° C. for an eight hour period. During this time two equivalents of ammonia were liberated and absorbed in an ammonia absorption tower. At the end of the reaction period the system was allowed to cool. A crystalline solid product formed which was recrystallized from 95% ethanol, filtered, and dried, leaving a light tan crystalline product. The product, which gave an analysis of 4.0% nitrogen (3.86% theoretical) and a molecular weight of 367±7 (376 theoretical), was identified as the cyclic urethane of N-dodecyl-N-sorbitylcarbamic acid.

*Example 6*

There were added together in a reaction vessel 70 parts of N-dodecylglucamine and 13 parts of urea. The mixture was slowly heated to 110 to 120° C. and maintained in that range for about three and three quarter hours. During the reaction period there was evolved and absorbed in an ammonia absorption tower one equivalent of ammonia. The reaction mixture was allowed to cool and the product settled out. The product was identified as N-dodecyl-N-sorbitylurea.

*Example 7*

Into a reaction vessel there were introduced 217 parts of N-octadecylglucamine and 30 parts of urea. The reactants were mixed while dry and then heated to 150 to 170° C. for about four hours during which time there was evolved and absorbed in an ammonia absorption tower two equivalents of ammonia. The reaction mixture cooled and the product settled out. The product was identified as the cyclic urethane of N-octadecyl-N-sorbitylcarbamic acid.

*Example 8*

There were mixed together in a reaction vessel 217 parts of N-octadecylglucamine and 30 parts of urea. The mixture was heated to 115 to 125° C. for a period of about three hours during which time there was liberated and absorbed in an ammonia absorption tower one equivalent of ammonia. The reaction mixture was cooled causing the product to settle out. The product was identified as N-octadecyl-N-sorbitylurea.

I claim:

1. A method for preparing the cyclic urethanes of N-alkyl-N-sorbitylcarbamic acid which comprises reacting an N-alkylglucamine, in which the alkyl group contains one to eighteen carbon atoms, and urea at a temperature of 140 to 175° C. until two equivalents of ammonia are liberated.

2. A method for preparing the cyclic urethane of N-methyl-N-sorbitylcarbamic acid which comprises reacting N-methylglucamine with urea at a temperature of 140 to 175° C. until two equivalents of ammonia are liberated.

3. A method for preparing the cyclic urethane of N-dodecyl-N-sorbitylcarbamic acid which comprises reacting N-dodecylglucamine with urea at a temperature of 140 to 175° C. until two equivalents of ammonia are liberated.

4. A method for preparing the cyclic urethane of N-octadecyl-N-sorbitylcarbamic acid which comprises reacting N-octadecylglucamine with urea at a temperature of 140 to 175° C. until two equivalents of ammonia are liberated.

5. As new compositions of matter, the cyclic urethanes of N-alkyl-N-sorbitylcarbamic acid, in which the alkyl group contains one to eighteen carbon atoms, formed by reacting an N-alkylglucamine with urea until two equivalents of ammonia are liberated.

6. As a new composition of matter, the cyclic urethane of N-methyl-N-sorbitylcarbamic acid, formed by reacting N-methylglucamine with urea until two equivalents of ammonia are liberated.

7. As a new composition of matter, the cyclic urethane of N-octyl-N-sorbitylcarbamic acid, formed by reacting N-octylglucamine with urea until two equivalents of ammonia are liberated.

8. As a new composition of matter, the cyclic urethane of N-dodecyl-N-sorbitylcarbamic acid, formed by reacting N-dodecylglucamine with urea until two equivalents of ammonia are liberated.

9. As a new composition of matter, the cyclic urethane of N-octadecyl-N-sorbitylcarbamic acid, formed by reacting N-octadecylglucamine with urea until two equivalents of ammonia are liberated.

10. As a new composition of matter, the cyclic urethane of N-butyl-N-sorbitylcarbamic acid, formed by reacting N-butylglucamine with urea until two equivalents of ammonia are liberated.

References Cited in the file of this patent

UNITED STATES PATENTS

| | | |
|---|---|---|
| 2,139,697 | Salsberg | Dec. 13, 1938 |
| 2,663,729 | Searle et al. | Dec. 22, 1953 |
| 2,677,698 | Deutschman et al. | May 4, 1954 |